Dec. 20, 1938. A. E. EULER 2,141,063

FITOVER FRAME FOR GLASSES

Filed July 23, 1937

INVENTOR.
ARTHUR E. EULER
BY Munn Anderson Liddy
ATTORNEYS.

Patented Dec. 20, 1938

2,141,063

UNITED STATES PATENT OFFICE 2,141,063

FITOVER FRAME FOR GLASSES

Arthur E. Euler, Oakland, Calif.

Application July 23, 1937, Serial No. 155,261

2 Claims. (Cl. 88—47)

My invention relates to improvements in a fitover frame for glasses, and it consists in the combinations, constructions, and arrangements hereinafter described and claimed.

An object of my invention is to provide a fitover frame for glasses that has pear-shaped lenses of the type shown in my design patent, Number 102,326, issued December 15, 1936, and in my co-pending application, Serial Number 132,514, filed March 23, 1937. The pear-shaped lenses lend themselves particularly well to a fitover frame because they permit the leaf spring connecting the lenses together, to be made much shorter in length due to the fact that the lenses extend nearer the nose, than is now the custom. This not only saves in material used and thus reduces the cost of manufacture, but also lessens the weight of the fitover frame and makes the device more comfortable to wear.

The lenses are mounted in rims and these rims may be loosened slightly to permit the lenses to be rotated therein. Since the lenses are pear-shaped, this rotation of the lenses will either decrease or increase the overall length of the glasses, depending upon the direction in which the lenses are rotated. In this simple way the fitover frame can be adjusted to fit the glasses of the wearer. The rims are flexible and may be tightened about the lenses after the lenses have been rotated into the desired positions.

Another distinct advantage of the pear-shaped lenses is that the tops of the lenses change very slightly in elevation when the lenses are rotated into different positions within the rims. This permits the lenses to be rotated to adjust the overall length of the frame to fit the glasses of the wearer without the tops of the lenses changing much in elevation. The hooks for connecting the fitover frame to the glasses are arranged to fit glasses of different types.

The pear-shaped lenses lend themselves to an Oxford frame using a short length spring and nose guards. This arrangement does away with the longer leaf spring now used on Oxford frames using other lens shapes.

Other objects and advantages will appear in the following specification and the novel features of the device will be set forth in the appended claims.

My invention is illustrated in the accompanying drawing, in which

Figure 1:
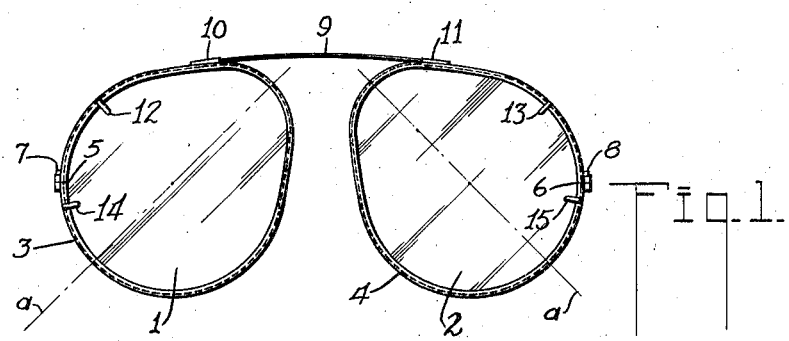
Figure 1 is a rear elevation of the fitover frame.

In carrying out my invention I provide a fitover frame in which the lenses 1 and 2 are pear-shaped. Each lens is divided into two equal halves by a median line $a$. This permits the lenses to be interchangeable.

The lenses are bounded by channel-shaped, flexible rims 3 and 4 and these rims are split at 5 and 6. The ends of the rims are held together by bolts 7 and 8 and these bolts may be tightened for causing the rims to frictionally engage with the peripheries of the lenses. The shape of the lenses is such that they may be rotated in the rims when the bolts 7 and 8 are loosened, and this will alter the overall length of the fitover frame to fit the glasses. The pear-shaped form of the lenses provides a substantially straight upper edge to each lens that will not raise or lower to any great extent when the lens is rotated in the rim.

The rims 3 and 4 are connected by a short leaf spring 9 that acts as a resilient bridge for the lenses. The ends of the spring are anchored to the rims at 10 and 11. Upper hooks 12 and 13 and lower hooks 14 and 15 are carried by the rims. It will be noted that the lower hooks 14 and 15 are disposed substantially midway between the top and bottom of the rims.

Figure 2:
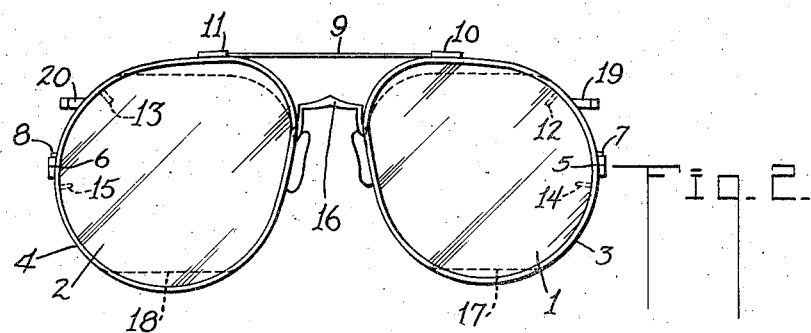
Figure 2 is a front elevation of the frame showing it applied to glasses.

In Figure 2, I illustrate the fitover frame attached to glasses indicated generally at 16. The lenses are first rotated in their rims to provide the correct overall length for the fitover frame. The bolts 7 and 8 are then tightened. In applying the fitover frame to the glasses 16, the rims 3 and 4 are swung away from each other. This will cause the hooks 12 to 15 inclusive to move over the peripheries of the lenses 17 and 18 in the glasses 16. The rims are now freed, and the spring 9 will cause the hooks 12 to 15 to engage with the lenses 17 and 18 and connect the fitover frame to the glasses.

Since the hooks 14 and 15 are disposed substantially at the middle of the rims, they will engage with the glass lenses 17 and 18 substantially midway between the top and bottom edges. This particular positioning of the hooks 14 and 15 will cause them to engage with the edges of all types of lenses. The leaf spring 9 extends substantially in a straight line between the two rims when the fitover frame is attached to the glasses. Should the rims 3 and 4 be swung still further away, the spring 9 will flex slightly in a direction opposite to that shown in Figure 1 to permit this movement. The hooks 12 to 15 inclusive do not interfere with the place where the temples are attached to the lenses, as shown at 19 and 20. The long spring, generally used with standard fitover frames is useless in the present device, because the pear-shaped form of the lenses bring the inner points of the rims closer together and at a higher point making a short spring possible. It is obvious that the difference in distance between the length and width of the lens may vary while still maintaining the pear-shaped appearance of the lens.

Figure 3:
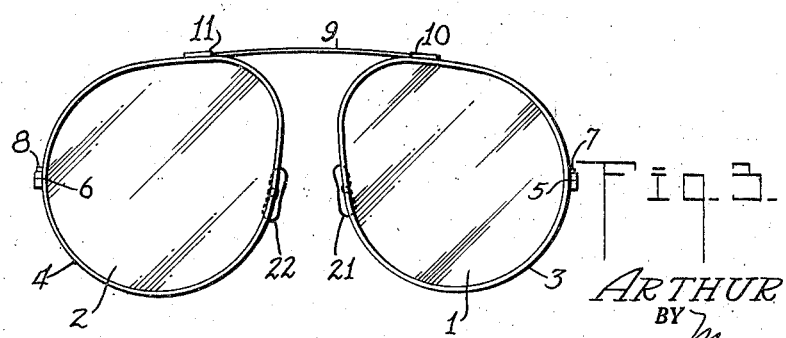
Figure 3 is a front elevation of an improved Oxford frame.

Figure 3 shows a modified form of device designed as an Oxford frame. This form of the device is identical to the form already described except that nose guards 21 and 22 take the place of the hooks 12 to 15 inclusive. Corresponding parts will therefore be given similar reference numerals. The short spring 9 will take the place of the usual long spring. The lenses 1 and 2 may be rotated in the rims 3 and 4 for moving the nose pads 21 and 22 toward or away from each other to adjust them to the nose. After adjustment has been made, the bolts 7 and 8 may be tightened.

While I have shown only the preferred form of my invention, it should be understood that various changes or modifications may be made within the scope of the appended claims without departing from the spirit of the invention.

I claim:

1. A fitover frame comprising pear-shaped lenses, flexible split rims enclosing the lenses, means for frictionally binding the rims about the lenses, a short leaf spring anchored to the rims, the arc of the spring being substantially flat, hooks secured to the rims and designed to engage with the lens rims of a pair of supporting glasses near the tops of the rims and substantially midway between the top and bottom of the rims, said means being manually adjustable for loosening the frictional hold of the rims on said first named lenses, whereby the lenses may be rotated for varying the over-all length of the fitover frame after which said means may be again tightened.

2. A fitover frame comprising pear-shaped lenses, flexible split rims enclosing the lenses, means carried by the split ends of each rim for tightening the rims around the lenses, hooks carried by the rims, a leaf spring connecting the rims together, said means when loosened permitting the pear-shaped lenses to be rotated in the rims into different angular positions for varying the distance between the lenses, whereupon the means may be tightened to tighten the rims about the lenses.

ARTHUR E. EULER.